United States Patent [19]

Kamysiak

[11] Patent Number: 5,255,421
[45] Date of Patent: Oct. 26, 1993

[54] WREATH MAKING APPARATUS

[76] Inventor: Gerald J. Kamysiak, 9540 Bolton Rd., Posen, Mich. 49776

[21] Appl. No.: 5,579

[22] Filed: Jan. 19, 1992

[51] Int. Cl.⁵ .............................................. B23P 11/00
[52] U.S. Cl. ................................................ 29/243.56
[58] Field of Search ............... 72/403, 450; 29/243.52, 29/243.56; 53/138 R, 138 A; 140/53, 57, 93 D

[56] References Cited

U.S. PATENT DOCUMENTS

| | | | |
|---|---|---|---|
| 1,936,611 | 11/1933 | Young | 72/403 |
| 3,133,288 | 5/1964 | Ohgren | 29/243.56 |
| 3,160,890 | 12/1964 | Lefebvre | 29/243.56 |
| 3,995,870 | 12/1976 | Hulek | 29/243.56 |
| 4,182,015 | 1/1980 | Niedecker | 29/243.56 |
| 4,802,271 | 2/1989 | Bader | 29/243.56 |
| 4,809,532 | 3/1989 | Tanaka et al. | 72/403 |
| 5,035,040 | 7/1991 | Kerrigan et al. | 29/243.56 |

Primary Examiner—Robert C. Watson
Attorney, Agent, or Firm—Brooks & Kushman

[57] ABSTRACT

Apparatus (10) for making wreaths is disclosed as including a pair of jaws (30) mounted on a support (20) to provide initial wreath wire deformation for capturing greens (14). A third jaw (34) also mounted on the support 20 provides further deformation to secure the greens. An actuating mechanism (36) which is of the pedal operated type initially moves the pair of jaws (30) for the initial wreath wire deformation and thereafter moves the third jaw (34) to provide the further deformation.

12 Claims, 2 Drawing Sheets

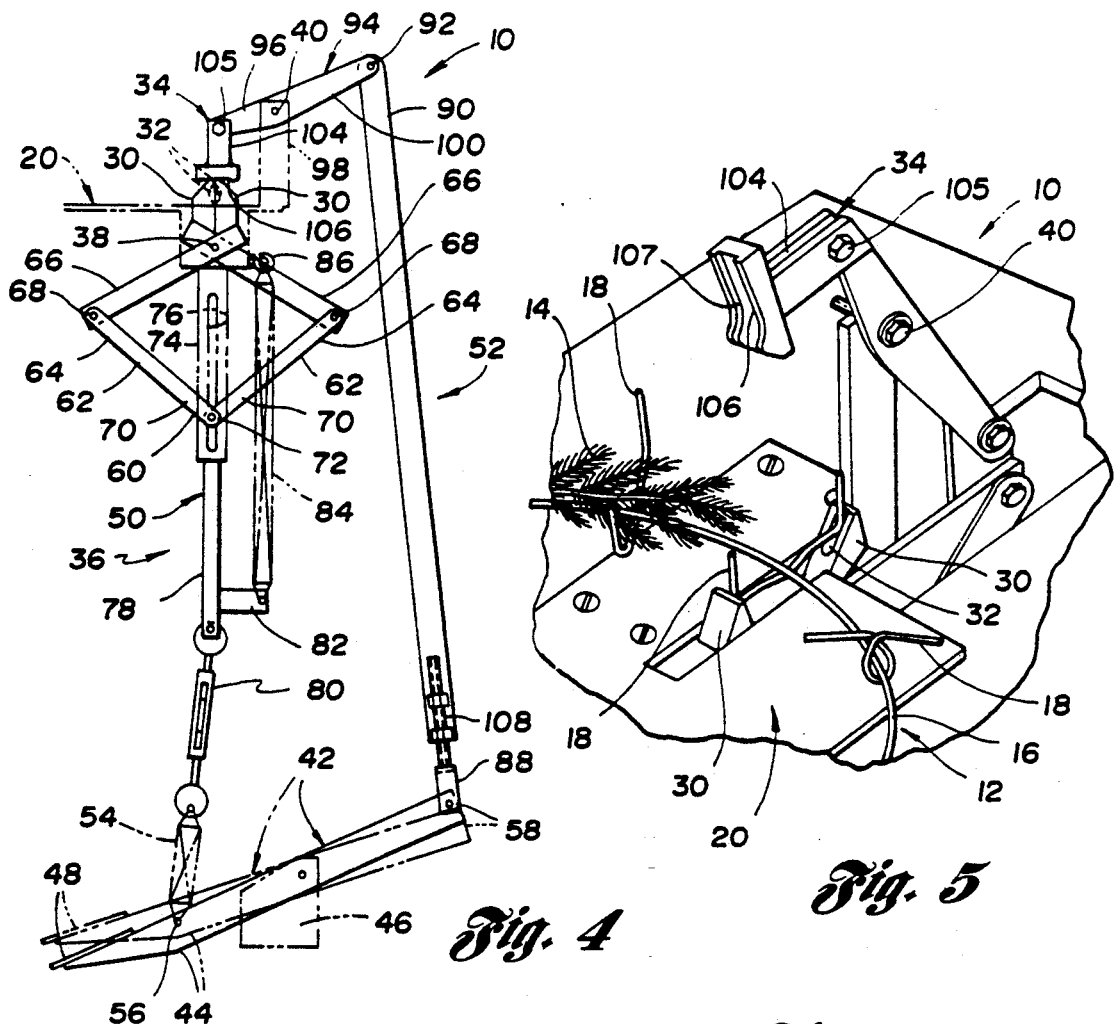
Fig. 4
Fig. 5
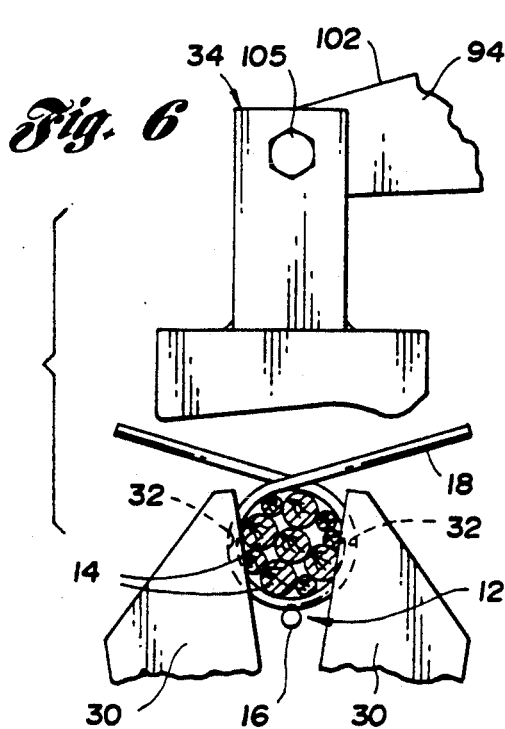
Fig. 6
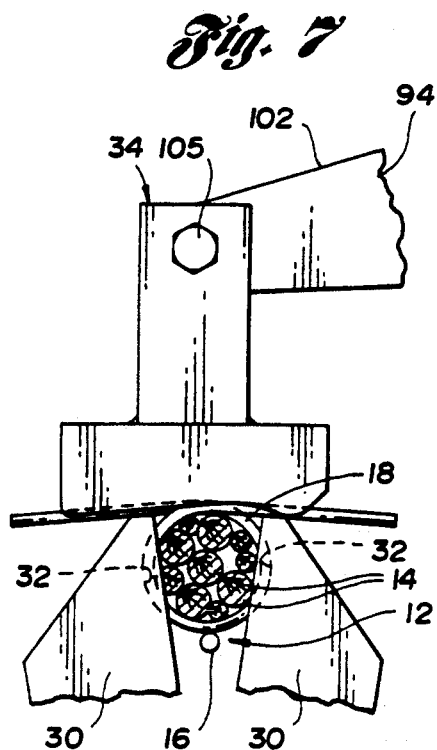
Fig. 7

WREATH MAKING APPARATUS

TECHNICAL FIELD

This invention relates to apparatus for making wreaths by deforming wreath wires around greens.

BACKGROUND ART

Wreaths are conventionally made from greens, i.e. evergreen branches, which are secured by wreath wires mounted on a round metal ring. The wreath wires are initially U-shaped and are normally welded to the round wreath wire. Placement of greens within each wreath wire is followed by deformation of the wreath wire to a closed shape and then subsequent further deformation to secure the greens. Conventionally the initial deformation is performed by a pair of jaws that are actuated by a foot pedal and the further deformation is performed by pounding with a hammer which is a process that is time consuming and hence costly as well as not being uniform in the amount of final pressure applied to the greens.

DISCLOSURE OF INVENTION

An object of the present invention is to provide improved apparatus for making wreaths.

In carrying out the above object and other objects of the invention, apparatus for making wreaths in accordance with the present invention includes a support and a pair of jaws mounted on the support for relative movement with respect to each other from an open position for receiving a generally U-shaped wreath wire therebetween toward a closed position to provide initial deformation of the wreath wire to a generally closed shape to capture the greens. A third jaw of the apparatus is mounted on the support for movement from an open position with respect to the pair of jaws toward a closed position to further deform the closed wreath wire to secure the greens. The apparatus also includes an actuating mechanism for initially moving the pair of jaws from the open position thereof toward the closed position to provide the initial deformation of the wreath wire and for moving the third jaw from the open position thereof toward the closed position thereof to provide the further deformation of the wreath wire after the initial deformation to thereby secure the greens within the wreath wire.

The apparatus includes one pivotal connector that mounts the pair of jaws for pivotal movement on the support between the open and closed positions thereof to perform the initial deformation of the wreath wire, and the apparatus also includes another pivotal connector that mounts the third jaw for pivotal movement on the support between the open and closed positions thereof to perform the further deformation of the wreath wire. The actuating mechanism also includes a common actuating member for moving the pair of jaws toward the closed position thereof to provide the initial deformation of the wreath wire and for also moving the third jaw toward the closed position to thereafter provide the further deformation of the wreath wire to secure the greens. This common actuating member is constructed as a foot pedal having a pivotal mount and a foot actuated pad for pivoting the pedal. The actuating mechanism also has one connection that connects the foot pedal to the pair of jaws and a has another connection that connects the foot pedal to the third jaw.

In the preferred construction, the one connection that extends between the pedal and the pair of jaws includes a spring that allows continued pedal movement after the pair of jaws cease moving such that the other connection can continue to move the third jaw. This one connection preferably has one end connected to the pedal between the pivotal mount and the foot pad of the pedal, while the other connection has one end connected to the pedal on the opposite side of the pivotal mount from the foot pad of the pedal. The one connection also has another end including a pair of links having respective ends connected to the pair of jaws. The apparatus also preferably has the pair of jaws provided with link portions extending therefrom and having respective pivotal connectors to ends of the pair of links. This pair of links also has other ends including a pivotal connector to each other, and the support includes a slide that guides the pivotal connector that connects the other ends of the pair of links to each other. The one connection further includes an adjuster for adjusting the length between its ends.

In the preferred construction of the apparatus, the other connection has one end thereof including a pivotal connector to the pedal and has another end including a pivotal connector to the third jaw. The preferred construction of the third jaw includes a lever having a central portion that is pivotally mounted by the associated pivotal connector of the third jaw on the support. The jaw lever has one end connected by the pivotal connector at the other end of the other connection, and the jaw lever has another end on the opposite side of the pivotal connector of its central portion as the one end of the jaw lever. The jaw also has a jaw member mounted on the other end of the jaw lever and including a jaw surface that engages the wreath wire during the further deformation.

In the preferred construction of the apparatus, the other connection includes an adjuster for adjusting the length between the ends thereof connected to the pedal and the third jaw. This adjuster of the other connection is disclosed as being located at the one end thereof adjacent the pivotal connector to the pedal.

A spring of the actuating mechanism is also provided to bias the actuating mechanism to locate the pair of jaws and the third jaw in their respective open positions.

BRIEF DESCRIPTION OF DRAWINGS

FIG. 4 is a side elevational view similar to FIG. 1 showing the apparatus after jaw movement to a closed position at which the deformation takes place;

FIG. 5 is a partial perspective view that illustrates the apparatus at an initial stage of the wreath making process;

FIG. 6 is a partial view that illustrates the apparatus after a pair of jaws have initially deformed the wreath wire to a closed shape with greens captured within the wreath wire; and FIG. 7 is a view similar to FIG. 6 after a third jaw has performed further deformation that secures the greens.

BEST MODE FOR CARRYING OUT THE INVENTION

Figure 1:
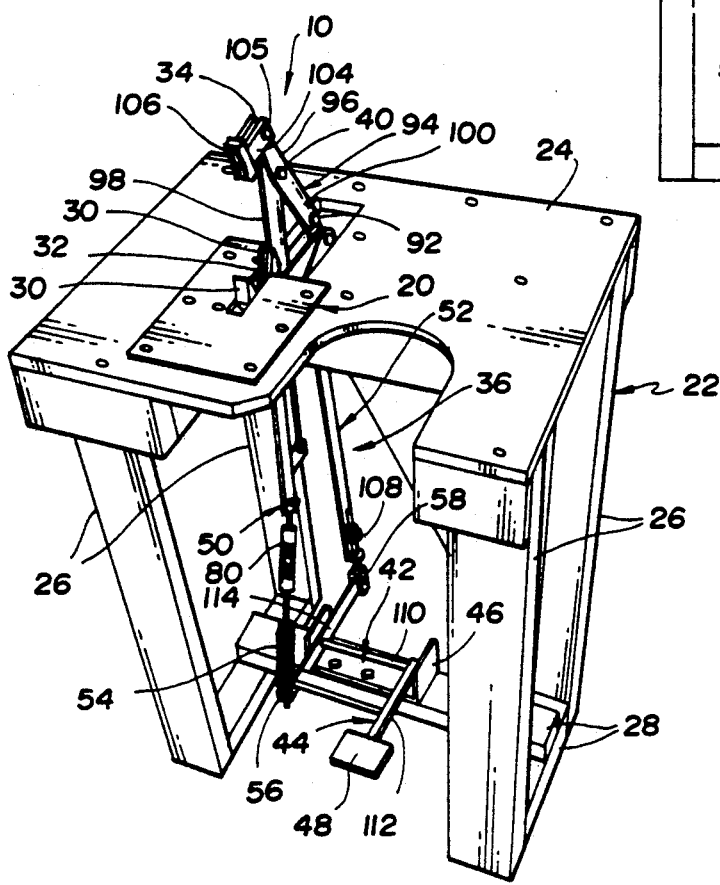
FIG. 1 is a side elevational view of wreath making apparatus constructed in accordance with the present invention.
Figure 2:
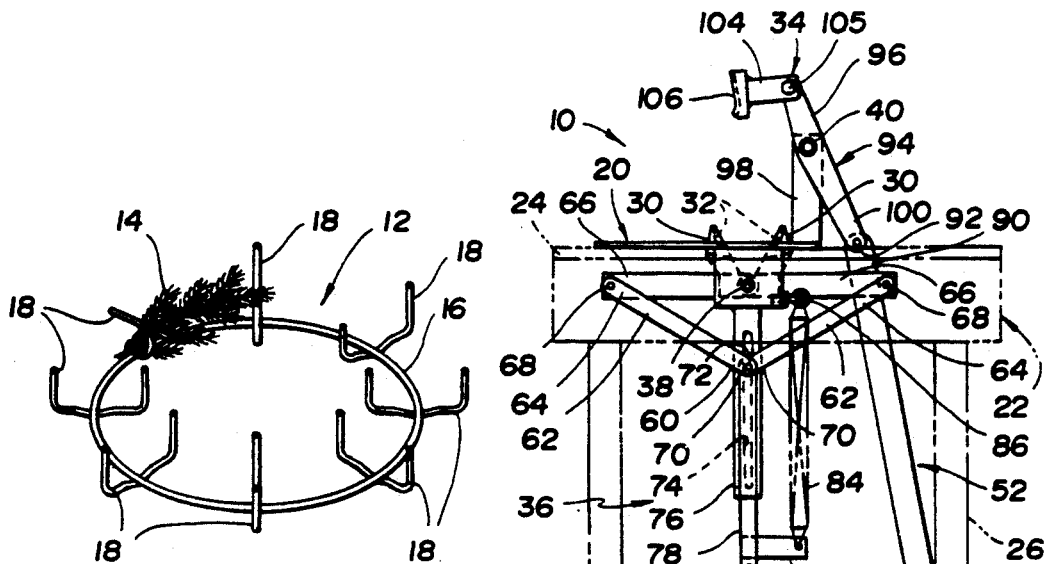
FIG. 2 is a perspective view which illustrates a round wreath ring that mounts U-shaped wreath wires that are deformed by the apparatus.

With reference to FIG. 1, apparatus 10 constructed in accordance with the present invention is utilized with a wire wreath ring 12 shown in FIG. 2 to make a wreath by securing greens 14. More specifically, the wreath ring 12 includes a round wire 16 on which U-shaped wreath wires 18 are mounted in any suitable manner which is usually by welding. During the wreath making process, the greens 14 are placed within each of the wreath wires 18 whose deformation, as is hereinafter more fully described in connection with FIG. 6 and 7, captures the greens so that a wreath is completed after each wreath wire holds greens that complete the annular shape. The wreath wires 18 are located on the front side of the ring 16 and are hidden from sight by greens from one or both adjacent wreath wires.

Figure 3:
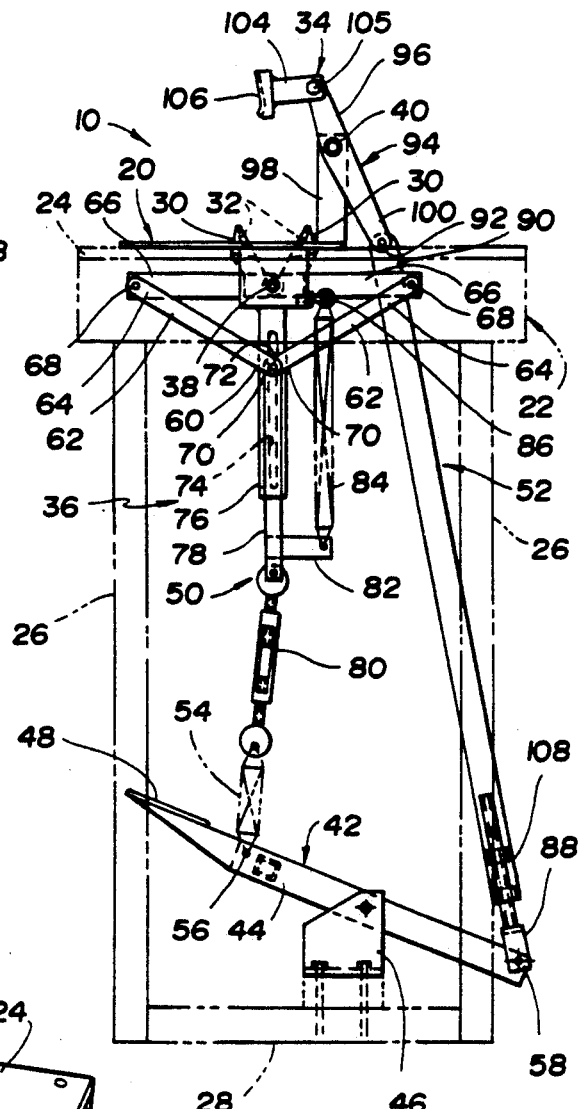
FIG. 3 is a front perspective view taken from above the apparatus.

With reference to FIGS. 1 and 3, the apparatus 10 for making wreaths includes a support 20 which is illustrated as being mounted on a table 22 by the table top 24 from which legs 26 extend downwardly and are supported by cross beams 28. A pair of jaws 30 of the apparatus are mounted by the support 20 for relative movement with respect to each other from the open position shown in FIG. 5 for receiving one of the generally U-shaped wreath wires 18 therebetween toward a closed position as shown in FIG. 4 so as to provide initial deformation of the wreath wire to a generally closed shape as shown in FIG. 6 to capture the greens 14. These jaws 30 have face grooves 32 in which the wreath wire 18 is received during the deformation.

A third jaw 34 of the apparatus 10 is mounted on the support 20 for movement from the open position of FIG. 1 with respect to the pair of jaws 30 toward the closed position of FIG. 4. This movement further deforms the closed wreath wire 18 from the position of FIG. 6 to the position of FIG. 7 to secure the greens 14. This further deformation positions the ends of the wreath wire 18 so as to extend away from each other in order to permit the greens adjacent wreath wires to be more easily positioned in front of these ends and thus hidden from sight.

As illustrated in FIGS. 1 and 3, the apparatus 10 includes an actuating mechanism 36 for initially moving the pair of jaws 30 from the open position of FIG. 1 toward the closed position of FIG. 4 to provide the initial deformation of the wreath wire and for moving the third jaw 34 from the open position thereof toward the closed position thereof to provide the further deformation of the wreath wire from the initially deformed position of FIG. 6 to the final position of FIG. 7 to thereby secure the greens 14 within the wreath wire 18.

As illustrated in FIG. 1, the apparatus includes one pivotal connector 38 that mounts the pair of jaws 30 for pivotal movement on the support 20 between the open and closed positions thereof respectively shown by FIGS. and 4 to perform the initial deformation of the wreath wire. Likewise, another pivotal connector 40 of the apparatus mounts the third jaw for pivotal movement on the support between the open and closed positions thereof as respectively shown by FIGS. 1 and 4 to provide the further deformation of the wreath wire from the position of FIG. 6 to the position of FIG. 7 as previously described.

Actuating mechanism 36 of the apparatus as shown in FIG. 1 includes a common actuating member 42 for moving the pair of jaws 30 toward the closed position thereof to provide the initial deformation of the wreath wire and for also moving the third jaw 34 toward the closed position thereof to thereafter provide the further deformation of the wreath wire to secure the greens as described above. More specifically, this common actuating member is constructed as a foot pedal 44 having a pivotal mount 46 supported by one of the table beams 28 and having a foot actuated pad 48 for pivoting the pedal. Actuating mechanism 46 has one connection 50 that connects the foot pedal 44 to the pair of jaws 30 such that depression of the foot pedal from the FIG. 1 position to the FIG. 4 position provide the closure of the pair of jaws to the FIG. 6 position to provide the initial deformation. Actuating mechanism 36 also has another connection 52 that connects the foot pedal 44 to the third jaw 34 such that the third jaw provides the further deformation of the wreath wire as previously described.

As illustrated in FIGS. 1 and 4, the connection 50 includes a spring 54 that allows continued movement of the pedal 44 after the jaws 30 cease moving such that the other connection 52 can continue to move the third jaw 34. More specifically, the spring 54 is elongated during this continued pedal movement as shown by the difference in its length between FIGS. 1 and 4. The rate of deformation of spring 54 thus determines the force with which the initial deformation is applied by the pair of jaws 30.

With continuing reference to FIG. 1, the connection 50 has one end 56 connected to the pedal 34 between the axis of the pivotal mount 46 and foot pad 48 thereof and, as specifically illustrated, this end 56 is one end of spring 54 described above. Furthermore, the other connection 52 has one end 58 connected to the pedal 44 on the opposite side of the pivotal mount 46 from the foot pad 48 of the pedal.

The one connection 50 of the actuating mechanism as shown in FIG. 1 also has another end 60 including a pair of links 62 having respective ends 64 connected to the pair of jaws 30. More specifically, the pair of jaws 30 as best shown in FIG. 4 has link portions 66 extending therefrom and having respective pivotal connectors 68 to the ends 64 of the pair of links 62. This pair of links 62 also has other ends 70 including a pivotal connector 72 to each other. Connector 72 slides within a slot 74 in a downward support projection 76 from the support 20 and guides a vertically movable slide member 78 whose lower end is connected to an adjuster 80 which is also connected to the spring 54 previously described. This adjuster 80 is of the turnbuckle type and allows adjustment of the length between the ends 56 and 60 of the connection 50 so that the pair of jaws 30 provides the required degree of wreath wire closure for the particular wreath wire being processed. Furthermore, the lower end of the slide member 78 also has a lateral extension 82 that connects to the lower end of a spring 84 whose upper end is connected to a hook connector 86 on support 20. This spring 84 returns the apparatus 10 from the closed jaw position of FIG. 4 to the open jaw position of FIG. 1 after release of the foot applied pressure to pedal 44.

As illustrated in FIG. 1, the connection 52 has the one end 58 thereof including a pivotal connector 88 connected to the associated end of the pedal 44 and has another end 90 including a pivotal connector 92 to the third jaw 34. This third jaw 34 preferably includes a lever member 94 having a central portion 96 that is pivotally mounted by the associated pivotal connector 40 of the third jaw on the support 20 on the upper end of an upstanding post 98. The jaw lever 94 has one end 100 connected by the pivotal connector 92 with the end 90 of connection 52 and has another end 102 on the opposite side of the pivotal connector 40 of its central portion 96. Jaw 34 also has a jaw member 104 fixedly mounted on the end 102 of the jaw lever 96 such as by a bolt 105. Jaw member 104 has a jaw surface 106 that engages the wreath wire 18 during the further deformation as described above. This jaw surface 106 has a groove 107, as shown in FIG. 5, to capture the ends of the wreath wire 18 during the further deformation.

The connection 52 illustrated in FIG. 1 for operating the third jaw 34 includes an adjuster 108 for adjusting the length between the ends 88 and 90 thereof so that the third jaw 34 is operated at the appropriate time for the particular wreath wire being formed. This adjuster 108 is of a suitable threading type and is located at the end 88 adjacent the pivotal connector 58 to the pedal 54.

As illustrated in FIG. 3, the pedal 44 embodying the common actuating member 42 has a pivotal support shaft 110 supported by the pivotal mount 46 which has a U-shaped configuration and is secured to one of the cross beams 28. A pedal member 112 extends from one end of shaft 110 and supports the foot pad 48, while a pedal connection member 114 extends from the other end of shaft 110 and is connected to the connections 50 and 52 as previously described.

While the best mode for carrying out the invention has been described in detail, those familiar with the art to which this invention relates will recognize various alternative designs and embodiments for carrying out the invention as described by the following claims.

What is claimed is:

1. Apparatus for making wreaths comprising:
a support;
a pair of jaws and one pivotal connector that mounts the pair of jaws for pivotal movement on the support for relative movement with respect to each other from an open position for receiving a generally U-shaped wreath wire therebetween toward a closed position to provide initial deformation of the wreath wire to a generally closed shape to capture greens;
a third jaw and another pivotal connector that mounts the third jaw for pivotal movement on the support for movement from an open position with respect to the pair of jaws toward a closed position to further deform the closed wreath wire to secure the greens; and
an actuating mechanism including a foot pedal having a pivotal mount and a foot actuated pad for pivoting the pedal, the actuating mechanism having one connection that connects the foot pedal to the pair of jaws to initially move the pair of jaws from the open position thereof toward the closed position to provide the initial deformation of the wreath wire, and the actuating mechanism having another connection that connects the foot pedal to the third jaw to move the third jaw from the open position thereof toward the closed position thereof to provide the further deformation of the wreath wire after the initial deformation to thereby secure the greens within the wreath wire.

2. Apparatus as in claim 1 wherein the one connection includes a spring that allows continued pedal movement after the pair of jaws cease moving such that the other connection can continue to move the third jaw.

3. Apparatus as in claim 2 wherein the one connection has one end connected to the pedal between the pivotal mount and foot pad thereof, and wherein the other connection has one end connected to the pedal on the opposite side of the pivotal mount from the foot pad of the pedal.

4. Apparatus as in claim 3 wherein the one connection has another end including a pair of links having respective ends connected to the pair of jaws.

5. Apparatus as in claim 4 wherein the pair of jaws has link portions extending therefrom and having respective pivotal connectors to said ends of the pair of links, the pair of links having other ends including a pivotal connector to each other, and the support including a slide that guides the pivotal connector that connects the other ends of the pair of links to each other.

6. Apparatus as in claim 5 wherein the one connection further includes an adjuster for adjusting the length between its ends.

7. Apparatus as in claim 3 or 6 wherein the other connection has the one end thereof including a pivotal connector to the pedal and has another end including a pivotal connector to the third jaw.

8. Apparatus as in claim 7 wherein the third jaw includes a lever having a central portion that is pivotally mounted by the associated pivotal connector of the third jaw on the support, the jaw lever having one end connected by the pivotal connector at the other end of the other connection, the jaw lever having another end on the opposite side of the pivotal connector of its central portion as the one end thereof, and the jaw having a jaw member mounted on the other end of the jaw lever and including a jaw surface that engages the wreath wire during the further deformation.

9. Apparatus as in claim 8 wherein the other connection includes an adjuster for adjusting the length between the ends thereof connected to the pedal and the third jaw.

10. Apparatus as in claim 9 wherein the adjuster of the other connection is located at the one end thereof adjacent the pivotal connector to the pedal.

11. Apparatus for making wreaths comprising:
a support;
a pair of jaws and a pivotal connector that provides pivotal mounting of the pair of jaws on the support for pivotal movement with respect to each other from an open position for receiving a generally U-shaped wreath wire therebetween toward a closed position to provide initial deformation of the wreath wire to a generally closed shape to capture greens;
a third jaw and a pivotal connector that mounts the third jaw on the support for movement from an open position with respect to the pair of jaws toward a closed position to further deform the closed wreath wire to secure the greens; and
an actuating mechanism including a foot pedal having a pivotal mount and a foot actuated pad for pivoting the pedal; the actuating mechanism having one connection that connects the foot pedal between the pivotal mount and pad thereof to the pair of jaws to initially move the pair of jaws from the open position thereof toward the closed position upon pedal movement to provide the initial deformation of the wreath wire; the one connection having a spring that deflects to limit the extent of the initial deformation; and the actuating mechanism having another connection that connects the foot pedal on the opposite side of the pivot mount from the pad thereof to the third jaw to move the third jaw from the open position thereof toward the closed position thereof by continued pedal movement as the spring of the one connection deflects such that the third jaw provides the further deformation of the wreath wire after the initial deformation to thereby secure the greens within the wreath wire.

12. Apparatus for making wreaths comprising:

a support;

a pair of jaws and a pivotal connector that provides pivotal mounting of the pair of jaws on the support for pivotal movement with respect to each other from an open position for receiving a generally U-shaped wreath wire therebetween toward a closed position to provide initial deformation of the wreath wire to a generally closed shape to capture greens;

a third jaw and a pivotal connector that mounts the third jaw on the support for movement from an open position with respect to the pair of jaws toward a closed position to further deform the closed wreath wire to secure the greens; and an actuating mechanism including a foot pedal having a pivotal mount and a foot actuated pad for pivoting the pedal; the actuating mechanism having one connection that connects the foot pedal between the pivotal mount and pad thereof to the pair of jaws to initially move the pair of jaws from the open position thereof toward the closed position upon pedal movement to provide the initial deformation of the wreath wire; the one connection having an adjuster that allows adjustment of the length thereof between the foot pedal and the third jaw and also having a spring that deflects to limit the extent of the initial deformation; the actuating mechanism having another connection that connects the foot pedal on the opposite side of the pivot mount from the pad thereof to the third jaw to move the third jaw from the open position thereof toward the closed position thereof by continued pedal movement as the spring of the one connection deflects such that the third jaw provides the further deformation of the wreath wire after the initial deformation to thereby secure the greens within the wreath wire; the other connection having an adjuster that allows adjustment of the length thereof between the foot pedal and the third jaw; and a spring that biases the actuating mechanism to locate the pair of jaws and the third jaw in their respective open positions.

* * * * *

UNITED STATES PATENT AND TRADEMARK OFFICE
CERTIFICATE OF CORRECTION

PATENT NO. : 5,255,421
DATED : October 26, 1993
INVENTOR(S) : Gerald J. Kamysiak It is certified that error appears in the above-identified patent and that said Letters Patent is hereby corrected as shown below:

Column 3, Line 58
after "FIGS." insert --1--.

Signed and Sealed this

Twelfth Day of April, 1994

Attest:

BRUCE LEHMAN

Attesting Officer     Commissioner of Patents and Trademarks